United States Patent [11] 3,607,316

[72] Inventor Jaquelin H. Hume
 120 Montgomery St., San Francisco, Calif. 94104
[21] Appl. No. 601,293
[22] Filed Dec. 8, 1966
[45] Patented Sept. 21, 1971

[54] PROCESS OF PRODUCING LARGE DEHYDRATED ONION PIECES
 7 Claims, 4 Drawing Figs.
[52] U.S. Cl. .......................................................... 99/204
[51] Int. Cl. ....................................................... A23b 7/02
[50] Field of Search ............................................ 99/204, 100

[56] References Cited
UNITED STATES PATENTS

| | | | |
|---|---|---|---|
| 2,406,431 | 8/1946 | Miller .......................... | 99/204 |
| 2,541,701 | 2/1951 | Karmen et al. ............... | 99/204 X |
| 3,098,750 | 7/1963 | Prater et al. .................. | 99/204 |
| 3,113,875 | 12/1963 | Prater et al. .................. | 99/204 |

*Primary Examiner*—Raymond N. Jones
*Assistant Examiner*—J. M. Hunter
*Attorney*—Morton, Bernard, Brown, Roberts & Sutherland

ABSTRACT: Producing large dehydrated onion pieces by submerging large cut onion pieces in a liquid, repeatedly drawing a vacuum over the liquid in order to remove at least one epidermol membrane and subsequently drying.

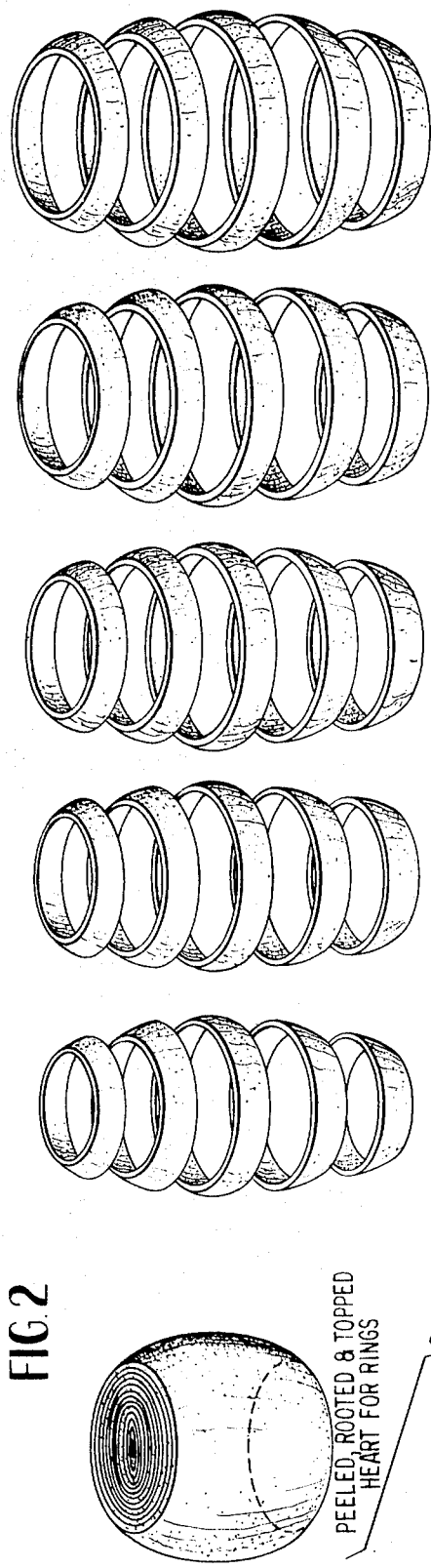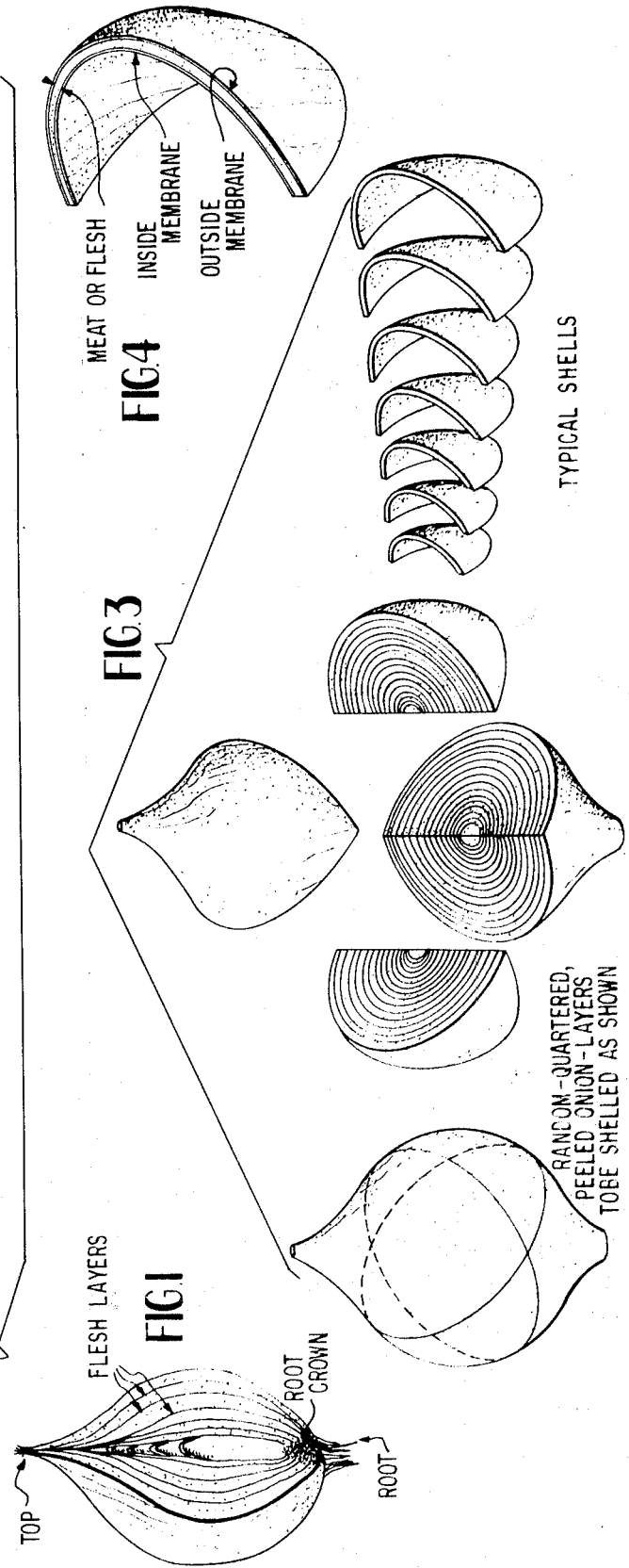

PROCESS OF PRODUCING LARGE DEHYDRATED ONION PIECES

Producing large dehydrated onion pieces by submerging large cut onion pieces in a liquid, repeatedly drawing a vacuum over the liquid in order to remove at least one epidermal membrane and subsequently drying.

This invention relates to a new onion product and processes for producing it and, more particularly, to a new means of treating the layers of onion flesh —also called sheaths or fleshy scales —to render them permeable, thereby making them readily available for further processing, for example, rapid dehydration, rehydration, and other treatment with additive ingredients.

The unique layer structure of the onion bulb has heretofore largely determined the size and shape of the piece which is commercially dehydratable and rehydratable. Each layer regards onion is protected on both sides by an epidermis which is substantially one cell in thickness and is a significant barrier to further treatment, processing and water vapor removal during dehydration, and to liquid reentry during rehydration. This unique structure of the onion bulb has forced dehydrators to slice onions into slices about one-eighth inch thick, or to dice or kibble prior to dehydration. During dehydration almost all drying, i.e., removal of water, takes place through the cut surfaces. If onions are sliced more than one-eighth inch thick, the rate at which the onions can be dehydrated is reduced sharply and the quality of the pieces being dehydrated is impaired. The slices, rings, or dice produced by this practice are too thin vertically from cut-surface to cut-surface to be used for many normal applications of onions, e.g., in stews, casseroles, salads, snack items, oriental-type and other dishes. For these latter applications, layer or sheath sections of onion produced by quartering rather than slicing, are desired.

Onion rings having a vertical dimension greater than one-eighth inch are also in demand for preparing the popular French-fried onion rings. Most restaurants have had to prepare their own from whole fresh onions, since no factory-prepared dehydrated rings of the requisite dimension are available and no commercially practicable process for producing them is known.

It is the object of this invention to provide new methods for processing pieces of onion layers of any useful dimension in the vertical direction, including pieces having a vertical dimension between cut surfaces far in excess of the present usual one-eighth inch, thus permitting their rapid dehydration and rapid rehydration, for example, without substantial deterioration or loss of flavor, and the ready addition of ingredients desirable for improving the color, flavor, or texture of the product. These processes provide, for the first time, new products of such processed pieces essentially distinguished by the substantial absence of one or more of their original epidermal membranes.

Heretofore, pieces of onion layers having a relatively large vertical dimension between cut surfaces have been found to pass through present normal dehydration processes which require about 20 hours and still retain most of their original moisture. Such pieces or "slabs" even if dried eventually, are generally poor in quality because of damage during the drying process. These undesirable slabs are not present if the onion bulb is sliced relatively thinly in a generally transverse manner and because such slabs with large surfaces of both their original epidermal membranes intact have proved difficult to dehydrate, commercially dehydrated onion has always been dried in the form of slices about one-eighth inch in thickness, or in diced or kibbled form. This traditional practice has two major drawbacks:

1. The many slicing cuts necessary for dehydration cause precursors and enzymes to come in contact and form the onion flavor. Since many of the flavoring constituents are volatile, unstable, or both, they are lost during the drying step. representation
2. It will not practically produce the onion sheath sections for which commercial demand exists.

I have found that if the epidermis is removed from either or both sides of a piece of onion layer, the piece can be readily processed, for example, rapidly dehydrated or impregnated regardless of the very small cut surface that it may have. The epidermis on the inner or concave side of an onion piece is simpler to remove and comes away without breaking the adjacent flesh cells and hence there is no loss of flavor. I have further found that this epidermis can be removed by a process of immersion in an aqueous bath which is subjected to repeated applications of vacuum with moderate agitation, as further explained in detail, permitting simultaneous impregnation with additives, as desired.

For better understanding of my invention, reference is made to the accompanying drawing in which:

FIG. 1 shows a vertical axial section of a raw, unpeeled onion as received from the grower:

FIG. 2 shows, in perspective, an onion heart that has been peeled, rooted, and topped, as for conventional slicing and, in expanded view, rings for French frying cut therefrom;

FIG. 3 shows, in perspective, a peeled onion and, in expanded views, random quarters cut therefrom and typical "shells" or pieces of onion layer formed from a quarter; and FIG. 4 shows, in perspective, on an enlarged scale, a single "shell" and the epidermis and flesh portions thereof.

The vapor barrier supplied by nature by means of the epidermis on each side of an onion layer or sheath is easily demonstrated by attempting to dry a section of such layer or "shell." See FIGURE 4. Drying starts at the periphery of the shell and slowly progresses toward the center. If high temperatures are employed in an attempt to speed the drying process, the center of the shell rapidly reaches the temperature of the applied gas because there is no adiabatic cooling where no moisture is being released. As a result, the shell "stews" instead of dries, and the product develops a pink or brown discoloration and distorted flavor.

I have discovered that it is practical to dehydrate such shells or sections of onion layers of substantial vertical dimensions if one or both epidermal membranes have been removed or have been rendered porous enough to allow passage of water vapor during dehydration. Microscopic examination of an onion shell reveals a tightly adhering epidermal membrane on the convex side and a more loosely adhering epidermal membrane on the concave side. Both epidermal membranes are like tight films covering the fleshy onion cells. Removal of the convex epidermal membrane normally ruptures cells. The epidermis on the convex side can be removed mechanically by inserting a point under the epidermis and peeling it back as one would peel a peach. Pieces peeled in this manner dry quickly. The concave epidermis can be removed mechanically in an easier fashion. The inner or concave epidermis appears to be held by a weak cementing substance and when pulled away, the cells beneath remain intact. Pieces of onion sheath with uncut surface dimensions greater than three-sixteenths inch with both epidermal membranes intact dry so slowly that serious quality degradation occurs. On the other hand, pieces with uncut surface dimensions greater than three-sixteenths inch from which either or both epidermises are removed dry as rapidly or more rapidly than onion slices of one-eighth inch or less in thickness. These results indicate that in an untreated piece of onion: (a) both epidermal membranes are practically impervious to moisture vapor, and (b) removal of either or both membranes permits rapid commercial drying of pieces which cannot be achieved satisfactorily with both epidermal membranes intact.

A second series of tests was conducted to see if onion shells with one epidermal membrane removed dried in a comparable time to pieces from the same onions sliced in the conventional manner for drying. Approximately 1 inch square shell sections were compared to one-eighth inch slices. Samples were weighed after 1, 2, 4, 5, 6, 7, 8, and 24 hours in an atmospheric dryer operated at 130° F. The drying curves were quite close. The one-eighth inch slices had a slightly higher initial drying rate but after 24 hours the 1 inch square shell sections were lower in moisture. This test confirmed that onion shells with only one epidermal membrane could be practically dehydrated. Objective quality evaluation tests of the dried products actually indicated a slightly better color and about 20 percent stronger flavor for the shells over the one-eighth inch normal slices. All pieces with an epidermis removed rehydrated satisfactorily in 30 minutes in cold water and 10 minutes in hot water and after rehydration had the appearance, as well as the desired crisp texture, of the original raw piece.

Further tests were conducted to see if our discovery was advantageous when used with vacuum drying and freeze drying. When pieces of onion shells, both with and without epidermis, were vacuum dried side by side, it was found that those with epidermis removed had a moisture content of 6.7 percent after 10 hours, whereas those with epidermis intact required 19 hours to attain the same moisture content. It was also found that when the dry pieces were reconstituted, rehydration time was much faster and more complete in pieces with the epidermis removed. At the end of 20, 40 and 80 minutes soaking, pieces with epidermis removed had increased in weight 62.5 percent, 84.0 percent, and 74.0 percent more than corresponding pieces with epidermis intact. When similar tests were conducted by freeze drying pieces of onion shells both with and without epidermis, comparison of pieces at comparable time intervals showed that those with epidermis removed had appreciably lower moisture content than those with epidermis intact. In one test, pieces with epidermis removed had a 4 percent moisture content after 9 hours, while pieces with results intact had a moisture content of 25 percent. These tests show that our process is effective in various types wavelength dehydration procedures.

Since it has been demonstrated that a new onion product with advantages over the conventionally dried product could be produced by removal of the epidermis from a shell or section of onion layer, tests were initiated to discover a commercial process for removal of the epidermis. Sections of onion shells about 1 inch square were immersed in a 0.5 percent solution of commercial cellulase. The extremities of the concave epidermal membrane started to separate in 10 or 15 minutes at room temperature, but the onion cells were also attacked by the enzyme. characters epidermal layer the source separated in 6 to 7 hours but 20 percent of the onion weight was lost in the process. By agitating the pieces in contact with the enzyme solution, most of the epidermis was removed in 30 minutes. In one test, 10 percent of the onion weight and 35 percent to 40 percent of the onion solids were lost. Extended cellulase treatment completely dissolved the epidermis in about 72 hours, but most of the onion was destroyed. Thus, the use of cellulase proved to ba a possible but impractical way to prepare the onion for producing our novel product.

A series of tests using commercial pectinase gave similar results. The epidermis was loosened in 30 minutes with agitation and in 4 to 8 hours without agitation. As with the use of cellulase, about 10 percent of the onion weight was lost during this treatment.

The next approach was a chemical one using 0.5 percent solutions of wetting and chelating agents such as EDTA (ethylene-diaminetetraacetic acid), sodium tripolyphosphate, sodium hexametaphosphate, disodium EDTA, tetrasodium EDTA, and sodium acid pyrophosphate. These chemicals loosened the epidermis in about the same time as pectinase. Sodium tripolyphosphate was the most efficient, removing the epidermis in 45 minutes with agitation, or in 4 to 5 hours with occasional stirring. In comparison, soaking in water alone loosened the epidermis in 12 to 24 hours to a point where it could be removed by agitation. These tests demonstrated that prolonged soaking in chemical solutions or in water is another possible but not necessarily desirable means of removing the epidermis.

It was evident in the preliminary tests that the epidermis loosens first at the edges and that separation from the flesh progresses inwardly. The epidermis can be easily separated from the sheath by agitation, once it is completely loosened. In order to get liquids to the center of the piece quickly, pieces of onion shell were subjected to vacuum under liquid. When the vacuum was released, liquid penetrated to all areas between the concave epidermis and the fleshy onion cells. The epidermal membrane was completely loosened and could be separated by agitation, regardless of the additives in the liquid. Since water proved to be as efficient as enzyme or chemical solutions, water alone was used in subsequent tests. When a vacuum of 29 inches hg. was applied and released on submerged onion shell sections, any air in or between the onion fleshy cells was replaced by the liquid and resulted in a weight gain of about 22 percent. Since this extra water has to be removed in dehydration and since intercellular air is desirable to the appearance of the finished product, variations of the vacuum treatment were tried.

Submerged sections of shell up to 1 inch square were successfully treated to loosen the concave epidermis by the repeated application and release of vacuum. The loosened epidermis was separated from the layer oxygen shell section by agitation. Larger pieces were successfully treated by applying rapidly repeated vacuums of 7 to 20 inches hg., followed by release under liquid. In one test, a whole onion was peeled and top and root ends removed. When this whole onion so was subjected to five short vacuum applications of 15 inches hg. and released under water, the concave epidermis of each sheath was loosened. When the sheaths were separated, this epidermis, in many instances, was lightly attached to the convex surface of the sheath. The loosened epidermis was easily removed by stirring in water. When onion layers and removed epidermal membranes are together in a liquid, care should be taken to isolate one from the other to prevent accidental clinging of epidermal membrane to a surface from which the epidermis has been removed. Such accidental reapplication of epidermis prevents effective dehydration substantially to the same degree as when the epidermis is intact.

With the partial vacuum described above, removal of intercellular air was avoided, and the dried products had the same desirable appearance as those from which the epidermis had been removed by hand. Addition of an appropriate amount of an approved sulfite to the water produces an end product of lighter color. Other approved additives can also be introduced into the onion by being added to the water to realize desired changes in various product characteristics, such as flavor and texture.

One possible disadvantage was encountered in loosening the epidermis by vacuum treatment while submerged in liquid. Since onion solids are largely soluble sugars, about 5 percent to 10 percent of the onion solids migrated to the treating water. This loss was eliminated by dissolving sufficient additional solids, for example sucrose, in the water to prevent such minor solids loss. In our preferred process a 5 percent solution of sucrose proved satisfactory.

We have experimented with immature onions, freshly harvested onions, and onions which have been stored for long periods. By varying the vacuum treatment our processes were effective with all types tested. We have found that substantially complete removal of the concave epidermis can be accomplished by repeated application and release of about 7 to 20 inches hg. vacuum on submerged pieces over a period of about 2 minutes.

By our processes, large sections of onion shell can be processed, for example, dehydrated rapidly, mainly through uncut surfaces, to produce the novel products of our invention. These products are radically different in structure and practical application from any processed onion products previously disclosed, and no previous dehydrated product will so closely resemble in appearance and texture a similar large-sized piece of onion in rehydrated form. The processes described for producing these novel onion layer sections are our present preferred methods, but any other nondamaging means of epidermis removal or treatment to render the epidermis sufficiently permeable would be satisfactory.

Having described the products and processes of my invention in terms of the best modes now known to me of producing and practicing the same, what I desire to secure by letters patent is set forth in the appended claims.

1. A process for producing a dehydrated onion product having all uncut surface dimensions of at least about three-sixteenth inch comprising the steps of peeling, rooting, and topping the onion, removing the epidermis from at least one side of the layers of the onion, and then drying said layers in pieces of desired size.

2. A process according to claim 1 in which the epidermis is loosened by submerging the layers in a liquid, drawing a vacuum over the liquid, and then releasing the vacuum while keeping the layers submerged.

3. A process according to claim 2 in which each onion layer is in discrete sections before submerging and the loosened epidermis is removed from the sections by agitation.

4. A process according to claim 3 in which the concave epidermis is loosened from the submerged sections and the sections and removed epidermis then mutually isolated.

5. A process according to claim 2 in which the liquid contains sufficient dissolved solid material to prevent substantial osmotic loss of soluble onion solids to the liquid.

6. A process according to claim 5 in which the dissolved solid material is essentially sucrose. evaporation 7. A process according to claim 5 in which the dissolved solid material includes one or more additives for incorporation into the layers.

UNITED STATES PATENT OFFICE
CERTIFICATE OF CORRECTION

Patent No. 3,607,316          Dated September 21, 1971

Inventor(s) Jaquelin H. Hume

It is certified that error appears in the above-identified patent and that said Letters Patent are hereby corrected as shown below:

Column 1, lines 16 and 17, "regards onion" should read -- of onion --. Column 3, line 33, "wavelength" should read -- of --; line 43, "characters epidermal layer the source" should read -- The epidermal layer became --. Claim 6, line 2, cancel "evaporation".

Signed and sealed this 25th day of April 1972.

(SEAL)
Attest:

EDWARD M. FLETCHER, JR.          ROBERT GOTTSCHALK
Attesting Officer          Commissioner of Patents